United States Patent [19]

Dawson et al.

[11] Patent Number: 4,624,795

[45] Date of Patent: Nov. 25, 1986

[54] AQUEOUS ACID GELS AND USE THEREOF

[75] Inventors: Jeffrey C. Dawson, Katy; Robert R. McDaniel; Lawrence P. Sedillo, both of Houston, all of Tex.

[73] Assignee: BJ-Titan Services Company, Houston, Tex.

[21] Appl. No.: 717,208

[22] Filed: Mar. 28, 1985

[51] Int. Cl.$^4$ ............................................. E21B 43/27
[52] U.S. Cl. ................................. 252/8.553; 166/307; 525/326.6
[58] Field of Search ...................... 252/8.55 C, 8.55 R; 526/278; 525/326.6; 166/307, 308

[56] References Cited

U.S. PATENT DOCUMENTS

| | | | |
|---|---|---|---|
| 3,779,914 | 12/1973 | Nimerick | 252/8.55 |
| 3,888,312 | 6/1975 | Tiner et al. | 252/8.55 X |
| 4,172,041 | 10/1979 | Clampitt et al. | 252/8.55 |
| 4,324,668 | 4/1982 | Harris | 252/8.55 |
| 4,500,437 | 2/1985 | Engelhardt et al. | 252/8.55 |
| 4,518,745 | 5/1985 | Engelhardt et al. | 526/278 X |

*Primary Examiner*—Herbert B. Guynn
*Attorney, Agent, or Firm*—Charles D. Gunter, Jr.

[57] ABSTRACT

Copolymers of a predominant proportion of an olefinically unsaturated sulfonic acid, an acrylamide, a vinyl phosphonic acid, and optionally other copolymerizable vinyl monomers, form aqueous acid gel compositions when added to the aqueous acid along with a gelling agent selected from titanium or zirconium compounds, and retarded gel destabilizing compounds containing fluoride, sulphate or phosphate anions, the apparent viscosity and time of stability of the acid gel composition being controlled by the addition of these essential ingredients.

8 Claims, No Drawings

AQUEOUS ACID GELS AND USE THEREOF

BACKGROUND OF THE INVENTION

Many oil and gas wells are drilled into production strata composed of limestone, dolemite and other calcarous materials. Frequently, the production of hydrocarbons from these wells is less than desirable due to the low permeability of the strata which results in poor conductivity to the wellbore. It is common practice to fracture-acidize these formations in an attempt to improve the conductivity. This technique is accomplished by injecting an aqueous acid solution into the wellbore causing a fracture in the production strata. This fracture provides a permeable, conductive channel from the strata to the wellbore.

Hydrochloric acid in concentrations ranging from 3% to 28% is normally used in this stimulation of the carbonate formations. However, in using hydrochloric acid, the reaction of acid with carbonate rock occurs at such a fast rate that the acid is depleted rapidly. Such rapid depletion of acids results in a very limited depth of penetration of acid into the formation. In order to increase the depth of penetration of acid into the formation, acids have been retarded by adding a suitable viscosifying agent, chemical retarders, foaming the acid, emulsifying the acid, or by cross-linking the acid viscosifying agent. Each method of retardation has shown limited use in field applications. Each of these methods of retardation generate fluids of low viscosities and a low degree of viscous stability (viscosities changing with time) especially with increasing reservoir temperature.

It has been found advantageous to initially viscosify the fracture-acidizing fluid. The fluid's viscosity is proportionally related to the created fracture geometry and fracture width so that more viscous fluids will produce longer and wider fractures. In addition, the viscosity of the acid will decrease the reaction rate or retard the acid etching, allowing high strength acid to penetrate deep into the fracture during injection. After the viscous acid is injected into the fracture, the viscosity should diminish allowing the acid to etch the fracture faces. Stable viscosity and control thereof are a problem.

The previous fracture-acidizing fluids have been viscosified with synthetic polymers, derivatives of natural materials such as carboxymethyl cellulose, hydroxypropyl guar or biopolymers such as xanthan gum, and the like. The apparent viscosity of the thickened acid fluids is often low and decreases rapidly in strong acids due to the hydrolysis of the polymer. Synthetic polymers also often precipitate from solution in the presence of high concentrations of calcium and magnesium ions. These percipitants tend to plug the formation which can be detrimental to the recovery of the oil and natural gas from the reservoir. Improved thickened fracture-acidizing compositions are an objective of this invention.

SUMMARY OF THE INVENTION

Copolymers of a predominant proportion of an olefinically unsaturated sulfonic acid, an acrylamide, a vinyl phosphonic acid, and optionally other copolymerizable monomers, form aqueous acid gel compositions when added to the aqueous acid along with a gelling agent selected from titanium or zirconium compounds, and retarded gel destabilizing compounds containing fluoride, sulphate or phosphate anions, the apparent viscosity and time of stability of the acid gel composition being controlled by the addition of these essential ingredients.

DETAILED DESCRIPTION

This invention provides aqueous acid compositions having controlled viscosity and a method to regulate the apparent viscosity of aqueous acids for use in fracture-acidizing in oil and gas well stimulation. For the fracturing step the system can rapidly develop a significant viscosity increase, generate less friction pressure during pumping than the acid fluid, minimize fluid loss to reservoir rock during fracturing, is capable of reducing the viscosity in a controlled manner and does not generate residues after breakout. Generation of wide fractures to allow deeper acid penetration, retardation of reaction rate on the carbonates by hindering the migration of reaction products, and minimizing fluid leakoff into formation rocks are among the advantages of this invention. This is accomplished, as has been described, by the use of aqueous acids containing a defined copolymer of an olefinically unsaturated sulfonic acid, an acrylamide and vinyl phosphonic acid, optionally with other copolymerizable comonomers, that are gelled or cross-linked with titanium or zirconium compounds after addition thereof to the acid, and containing a gel destabilizing agent whereby the acid viscosity is controlled as desired and depending on the requirements of the fracture-acidizing operation. The resulting acid gel composition can be used in very strong acids with no degradation and at high temperatures often countered in many wells, with no viscosity breakdown other than when and as designed into the system. Thus the acid gel composition has moderately high viscosities with substantial shear stability at temperatures up to about 120° C.

In addition to excellent viscosity characteristic, and reduced pumping friction pressure, the acid reactivity of the acid gel compositions with limestone and the like is drastically reduced and controlled as desired. The acid gel composition is also free of residues in live or spent acid, minimizing potential formation damage and will not precipitate in the presence of Ca and Mg ions even when neutralized. Further, considerably deeper penetrations may be achieved by these acid gel compositions compared to previous acid formulations. The system is readily prepared in the field as needed and provides a method for controlling the apparent viscosity of aqueous acid by employing at least about 0.24 weight percent of the novel polymer of the invention, along with small amounts of the zirconium or titanium cross-linking or gelling agents, and controlled amounts of gel destabilizers to allow the controlled acid-calcium carbonate reaction and to facilitate well clean up. Breakout of the system is also controlled and accomplished without resulting in an insoluble residue.

The olefinically unsaturated sulfonic acids typically include vinyl sulfonic acid, styrene sulfonic acid, 2-acrylamido-2-alkylidene sulfonic acids of the formula

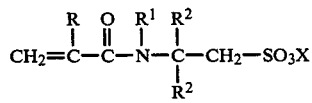

wherein R and $R^1$ are hydrogen or alkyl groups containing 1 to 4 carbon atoms, $R^2$ is hydrogen or alkyl groups containing 1 to 4 carbon atoms, and X is hydrogen or an ammonium or alkali metal cation; and the like. The acids may be used per se or in the form of the ammonium salt or alkali metal salts thereof.

The acrylamides have the formula

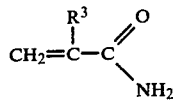

wherein $R^3$ is hydrogen, methyl or ethyl.

The vinyl phosphonic acids have the formula

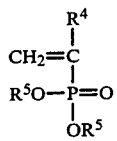

wherein $R^4$ is hydrogen or an alkyl radical containing 1 to 4 carbon atoms, $R^5$ is hydrogen or an alkyl radical containing 1 to 4 carbon atoms, and

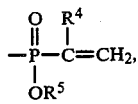

at least one of $R^5$ is preferably hydrogen. Ammonium or alkali metal salts of the vinyl phosphonic acids may be used.

Optionally there may be used N-vinylamides having the formula

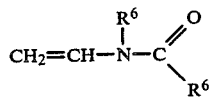

wherein $R^6$ is hydrogen, methyl or hydroxymethyl; and/or different ethylenically-unsaturated vinyl monomers having the formula

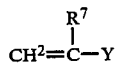

wherein $R^7$ is hydrogen or methyl and Y is selected from the group consisting of cyano; a carboxyl group or its alkali or ammonium salts; alkoxycarbonyl groups having 1 to 6, preferably 1 to 3, carbon atoms; hydroxyalkoxy-carbonyl groups having 1 to 3 carbon atoms; the N-methylolamidocarbonyl groups HOCH$_2$NH—CO—; methylol groups which may optionally etherified with alkanols having 1 to 4 carbon atoms; an alkanoylamino group having 1 to 4 carbon atoms which may optionally be N-substituted with methylol or alkyl having 1 to 4 carbon atoms, pyrrolidonyl-(1), phenyl, pyridinium; sulfonic acid groups or alkali metal or ammonium salts thereof; radicals of the formula

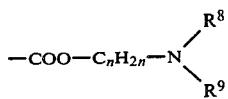

wherein $R^8$ and $R^9$ are the same or different alkyl radicals containing 1 to 4, preferably 1 to 2, carbon atoms, and n represents a number from 1 to 4; or radicals of the formula

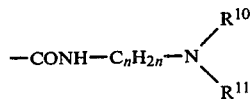

wherein $R^{10}$ and $R^{11}$ are the same or different and represent alkyls having 1 to 4, preferably 1 or 2, carbon atoms and n has the meaning given above; and quaternized moieties of the above two radicals quaternized by dimethyl sulfate or methyl chloride.

Preferably used are (1) a 2-acrylamide-2-alkylidene sulfonic acid, styrene sulfonic acid or vinyl sulfonic acid, (2) acrylamide, (3) vinyl phosphonic acid, (4) N-vinylformamide, and (5) monomers selected from the group consisting of N-vinyl-acetamide, N-vinyl-N-methyl-acetamide; N-vinylpyrrolidone; acrylic acid, alkali metal or ammonium salts thereof;

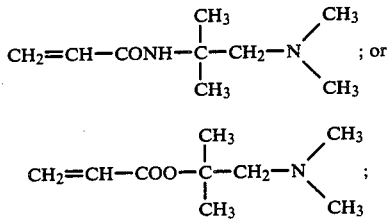

on in amounts of 45 to 94 weight percent of (1), 5 to 45 weight percent of (2), 1 to 6 weight percent of (3) and 0 to 20 weight percent of (4) and (5).

The copolymers may also contain small amounts of other vinylidene monomers containing at least one terminal >CH$_2$ group, so long as such other vinylidene monomers have no adverse effect on the thickening and other essential properties and advantages of the novel composition of this invention. Typical vinyl comonomers include the alkyl acrylates and alkacrylates; vinyl esters as vinyl acetate; monoolefins and diolefins; vinyl and vinylidene halides; vinyl ethers and ketones; and the like.

The copolymers are readily prepared by methods known and available to those skilled in the art. The polymerizations are normally conducted in closed vessels in an inert atmosphere as nitrogen, the vessel being equipped with heating, cooling and stirring means. The reactions are conducted at temperatures from about 0° C. to about 65° C. under autogenous pressure, or at induced pressures as desired.

The reactions are generally catalyzed by the presence of free-radical forming substances including peroxygen compounds such as potassium persulfate, ammonium persulfate, caprylyl peroxide, benzoyl peroxide, hydrogen peroxide, cumene hydroperoxide, sodium peracetate, sodium(2-ethylhexyl)percarbonate, azodiisobutyrl nitrile and the like; and with the so-called redox catalyst systems and heavy metal activated catalysts. Ultraviolet light may be used and heat is often enough to cause polymerization.

The monomers may be batch charged or continuously or intermittently added during the course of the polymerization, or by any other manner or technique normally used by those skilled in the art. The polymerizations may be batch, semi-batch or continuous. Agitation is normally used to obtain adequate mixing and heat transfer.

The polymerizations are usually conducted in a liquid media at a pH greater than about 6, preferably greater than 7.5 to about 9.5. Water is a useful material for those monomers that are sufficiently soluble to allow polymerization. The polymers may be isolated by evaporation of the water, by adding a polymer non-solvent to the aqueous solution. Solvents may be used for the polymerization that are solvents for the monomers and polymers, or that are solvents for the monomers and non-solvents for the polymers. In the former case, the polymers are isolated by evaporation of the solvent or by adding a polymer non-solvent. If the monomers used are not sufficiently soluble in the solvent to allow polymerization, surface active agents can be added in the polymerization media. These are well known and include anionic, cationic and non-ionic materials such as alkali metal alkyl sulfates, aralkyl sulfonates, fatty acid soaps, polyoxyalkylene materials and the like, and may be used in amounts from 2% to 7%.

The cross-linking agents used to cross-link the defined copolymers are hereinafter defined compounds of zirconium and titanium. These compounds or complexes are preferably reaction products of zirconium or titanium compounds with polyfunctional acids, containing at least 3 carbon atoms, including dicarboxylic acids, hydroxy-carboxylic acids, amine-carboxylic acids; including for example oxalic acid, malonic acid, succinic acid, glutaric acid, adipic acid, pimelic acid, suberic acid, azelaic acid, sebacic acid, maleic acid, fumaric acid, lactic acid, aspartic acid, malic acid, mandelic acid, citric acid, and the like. Particularly useful are the hydroxy-carboxylic acids such as lactic, malic and citric acids. Also useful are the complexes formed with these compounds and ammonia (ammonium hydroxide); amines containing 1 to 6 carbon atoms, including methyl amine, propyl amine, diethylamine, triethylene tetramine, isopropylamine, and the like; and hydroxyl amines such as triethanolamine, and diethanolamine, and the like. Typical compounds include titanium lactate, titanium malate, titanium citrate, zirconium lactate, zirconium malate, zirconium citrate and the like. A useful combination is one of these compounds such as zirconium lactate with isopropylamine or triethanolamine, in ratios of 1 mole Zr to 2 moles amine, for example.

The concentrations of metal cross-linker, calculated as $ZrO_2$ or $TiO_2$, should range from 0.25 to 5.0 percent by weight based on the weight of polymer. In fracture-acidizing applications, the optimal apparent viscosity preferably is achieved within less than about one minute after addition of the cross-linker. The cross-linker is added as an aqueous dilute solution to obtain a homogenous, uniform gel. The viscous stability of the fluid should exceed 6 hours at temperatures less than 150° C. The time of gel stability is controlled by the addition of gel degrading substances.

In fracture-acidizing applications, the time necessary to inject the acid solution into the well after preparation will vary depending on the acid volume, reservoir and treatment conditions. It is important to control the gel stability so that gel degradation occurs soon and only after the acid is injected and placed in the fracture. The rate of gel degradation is controlled in accordance with this invention by the concentration of a gel degrading substance. The substances applicable to this invention are compounds which contain fluoride, phosphate or sulfate anions, and multi-carboxylated compounds such as ethylene-diamine tetraacetic acid or its ammonium, alkali or alkaline earth metal salts. Preferred is a combination of fluoride ion and ethylenediamine tetraacetic acid. The fluoride substances include cryolite, $Na_3AlF_6$, potassium hexafluorophosphate, potassium fluorosilicate, sodium tetrafluoroborate, or alkyl or aryl sulfryl fluorides or organic halides such as

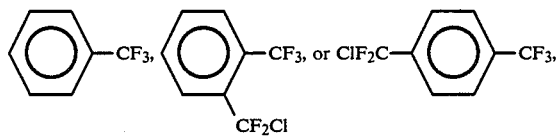

and the like. Typical phosphates include alkali or alkaline earth phosphates, and the like; and typical sulfates include alkali or alkaline earth sulfates, and the like.

The rate of fluoride release can be controlled by encapsulating the solid fluoride substances with synthetic polymers or natural gums or preparing water-in-oil emulsions of aqueous fluoride solutions, as is well known to those skilled in the art. Each of these methods will retard the rapid release of fluoride. The desired concentration of fluoride anion used is within the range of about 1 to about 10 weight percent, preferably 2 to 9, based on the weight of polymer. The concentration of ethylenediaminetetraacetic acid should range from about 5 to about 15 weight percent, preferably 7 to 12, based on the weight of polymer. The gel degrading substance preferably is added to the polymer solutions prior to adding the cross-linking agent to ensure a homogeneous blend.

The copolymers of this invention are readily soluble in water or aqueous acid solutions and hence can be easily handled. In fracture-acidizing applications, the polymer can be introduced to the acid solution in the form of finely ground powders as an aqueous polymer solution ranging from about 0.5% to about 6% by weight; hydrocarbon dispersions containing emulsifiers and 20 and 50% polymer by weight; or oil-in-water or water-in-oil emulsions containing emulsifiers and 20 to 50% polymer by weight. The polymers are effective acid viscosifiers for extended periods of time in concentrations ranging from greater than about 0.1 to 12 or more, preferably 0.30 to 0.95.

The acids commonly used for fracture-acidizing compositions and compatible with the macromolecule and cross-linking system of this invention are normally inorganic or strong lower organic acids having small pKa values, at 25° C. of less than 5. Examples of these acids include hydrochloric, formic, acetic, mono-, di- or trichloracetic acids, and the like. The most commonly used acid is hydrochloric acid ranging in concentration from 3% to 28% by weight.

In preparing the claimed composition in acid, the polymer is dissolve in hydrochloric acid and the gel destabilizer added just prior to addition of the cross-linking agent as described in the Examples hereinafter.

The following working Examples demonstrate the practice of the invention to regulate the viscosity of acidic fluids.

EXAMPLE 1

In a 1 liter reaction vessel there was added 288 grams of distilled water, 132 grams of acrylamido methylpropane sulfonic acid, and 4.8 grams of vinyl phosphonic acid. The pH was adjusted with 277 grams of 10 weight percent sodium hydroxide to 8.5. Then 96 grams of acrylamide and 7.2 grams of vinylformamide were added to the vessel. The solution was degassed with $N_2$ for 30–45 minutes. The reaction was then initiated with 2 ml of aqueous 1 weight percent ammonium peroxydisulfate. After a short induction period the reaction began. As the reaction proceeded the temperature increased to 65° C. The reaction was left undisturbed for 12 hours, yielding 30% by weight active copolymer. The water was evacuated from the gel yielding a dry, crystalline polymer that was easily ground into a fine white powder.

EXAMPLE 2

Into 500 ml of 15 weight percent hydrochloric acid in a Waring Blender was added 3.0 grams of the polymer described in Example 1. The solution was sheared to prevent the formation of insoluble lumps. After 1 hour of standing to complete hydration, the solution was cross-linked by adding 5 ml of (1.4% $ZrO_2$) aqueous solution of sodium zirconium citrate, resulting, within 5 seconds, in a viscous cross-linked gel. The gel was stable for 3 weeks at 35° C.

EXAMPLE 3

Into 500 ml of 28 weight percent hydrochloric acid in a Waring Blender was added 3.0 grams of the polymer prepared in Example 1. The solution was sheared to prevent the formation of insoluble lumps. After ½ hour of hydration, the solution was cross-linked by adding 2.5 mls of (1.4% $ZrO_2$) aqueous solution of zirconium lactate, resulting in a viscous cross-linked gel stable for 3 weeks at 35° C.

EXAMPLE 4

Into 317 ml of water, 3.0 grams of the polymer prepared in Example 1 was added with stirring. After hydrating for 30 minutes, the solution was treated with 3 ml of (13.7% $TiO_2$) of ammonium titanium lactate. There was no apparent change in viscosity. Then, 183 ml of 37 weight percent hydrochloric acid was added yielding an instant viscous cross-linked gel. The fluid remained gel for 3 days at 25° C.

EXAMPLE 5

A polymer and solution prepared in accordance with Example 2 was treated with 0.5 grams of potassium hexafluorophosphate and 0.3 grams of ethylenediamine tetraacetic acid before adding 5.0 ml of (1.4% $ZrO_2$) aqueous solution of sodium zirconium citrate, resulting in a viscous cross-linked gel. After 2 hours at 40° C., the viscosity declined to the initial viscosity of the polymer solution.

These polymers are easily cross-linked with small amounts of cross-linking agent. This allows one to provide compositions with predetermined gel times, the gel viscosity reduction being controlled by adding specific concentrations of gel degrading substances.

EXAMPLE 6

Into a 500 ml reaction vessel 100.0 grams of distilled water, 3.0 grams of vinyl phosphonic acid and 45.14 grams of styrene sulfonic acid were added. The pH was adjusted to 9.0 with 2.61 grams of 26° Be Aqua Ammonia. 42.69 grams of acrylamide in 157.0 grams of distilled water was then added to the vessel. After degassing with nitrogen, 1.0 ml of a 5.46% aqueous ammonium persulfate solution was added. After 90 minutes 1.0 ml of 0.034% aqueous sodium bisulfite solution was added and the mixture heated to 47° C. After 10 hours, a viscous polymer gel resulted. The water was evacuated from the gel yielding a dry crystalline substance which was ground into a fine white powder. 9.0 grams of this polymer was added into a Waring blender containing 500 ml of 15% by weight HCl. With moderate shear, the polymer hydrated in 30 minutes. The polymer solution was then treated with 0.3 grams of potassium hexafluorophosphate and 2.5 ml of an aqueous zirconium lactate citrate solution containing 1.40% by weight $ZrO_2$. Cross-linking occurred within 10 seconds, yielding a homogenously cross-linked gel. The viscosity declined as desired slowly at 23° C. after 6 hours to about 8 cps at 511 l/sec, the viscosity of the original polymer solution.

EXAMPLE 7

An oil well in Lamb County, TX was fracture-acidized as follows. The producing zone was the Clearfork formation at 6,084 feet and had a bottom hole static temperature of 100° F. Prior to treating, the well was producing 30 barrels of oil per day and 52 barrels of water per day. The treating fluid was prepared by blending 300 pounds of polymer described in Example 1 with 6,000 gallons of 20 percent by weight aqueous HCl containing 12 gallons of acid corrosion inhibitor, 12 gallons of non-emulsifying agent, 30 pounds of ethylenediaminetetraacetic acid and 30 gallons of a 50% weight aqueous citric acid solution. After allowing the polymer to hydrate for 1 hour, the fluid was treated while pumping into the well with 90 pounds of polyurethane encapsulated cryolite, 7500 pounds of 10–20 mesh sand as a propping agent and 30 gallons of a zirconium lactate citrate containing 1.40 percent by weight $ZrO_2$. Cross-linking occurred within 10 seconds yielding a homogenous cross-linked gel. The fluid was pumped into the well at 20 barrels per minute at a treating pressure of 2500 psi. The well was opened 6 hours later and produced a thin, neutralized acid solution. Thirty days after the treatment, the well was producing 55 barrels of oil per day and 81 barrels of water per day. After 60 days, the well was producing 106 barrels of oil per day and 83 barrels of water per day.

As has been shown, the invention provides a novel method to regulate the apparent viscosity of aqueous acids. The acid is initially viscosified with small amounts of the defined copolymer. The fluid viscosity of the acid solution is then significantly rapidly increased in several seconds, in excess of 100 cps at 170 $\sec^{-1}$, by cross-linking the added polymer with the defined titanium or zirconium compounds. The result is a firm, viscolelastic acid gel. The fluid viscosity can then be reduced over a period of time as desired by the presence of compounds containing fluoride, phosphate or sulfate groups. These anions eventually degrade the cross-linked structure so that the aqueous acid returns to a viscosity of less than 20 cps. The compositions of this invention normally develop in less than 1 minute a significant viscosity, even in concentrated acids at temperatures as high as 150° C. The pumping friction pressure of the gelled acids is below that of the ungelled acid pumped at the same rate. Further, the breakout of the system is controllable and accomplished without generation of measurable residues. This novel system provides new and useful advantages in acidizing and fracturing operations in oil and gas wells.

We claim:

1. An aqueous gel useful in fracture acidizing of oil and gas bearing formations, comprising:

an aqueous acid;

a copolymer containing about 45 to 94 weight percent acrylamidomethylpropane sulfonic acid, about 5 to 45 weight percent of acrylamide, and about 1 to 6 weight percent vinyl phosphonic acid;

a cross-linking agent for the copolymer comprising a polyfunctional acid compound of zirconium or titanium, the cross-linking agent being present in the range from about 0.25 to 5.0 weight percent based on the weight of copolymer, calculated as $ZrO_2$ or $TiO_2$; and a fluoride anion donating compound present in a gel degrading amount, said compound being selected from the group consisting of cryolite, $Na_3AlF_6$, potassium, hexafluorophosphate, potassium fluorosilicate, sodium tetrafluoroborate, alkyl or aryl sulfryl fluorides and organic halides of the formulae:

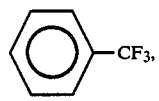

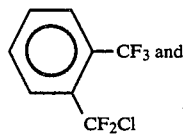

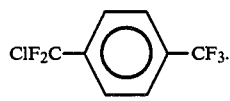

2. The aqueous gel of claim 1, wherein the copolymer also contains from 0 to 20 weight percent of N-vinylformamide.

3. The aqueous gel of claim 1, wherein the cross-linking agent is selected from the group consisting of sodium zirconium citrate, zirconium lactate, zirconium lactate citrate, and ammonium titanium lactate.

4. An aqueous gel useful in fracture acidizing of oil and gas bearing formations, comprising:

an aqueous acid;

a copolymer containing about 45 to 94 weight percent acrylamidomethylpropane sulfonic acid, about 5 to 45 weight percent of acrylamide, and about 1 to 6 weight percent vinyl phosphonic acid;

a cross-linking agent for the copolymer comprising a polyfunctional acid compound of zirconium or titanium, the cross-linking agent being present in the range from about 0.25 to 5.0 weight percent based on the weight of copolymer, calculated as $ZrO_2$ or $TiO_2$; and an encapsulated, gel degrading substance comprising the combination of about 1 to 10 weight percent based on the weight of polymer of a fluoride anion donating compound and about 5 to 15 weight percent based on the weight of polymer of ethylenediamine tetraacetic acid.

5. The aqueous gel of claim 4, wherein the fluoride anion donating compound is selected from the group consisting of cryolite and potassium hexafluorophosphate.

6. An aqueous gel useful in fracture acidizing of oil and gas bearing formations, comprising:

an aqueous acid;

a copolymer comprising (A) about 5 to 45 weight percent acrylamide of the formula

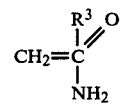

wherein $R^3$ is hydrogen or methyl, (B) about 1 to 6 weight percent vinylphosphonic acid of the formula

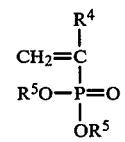

wherein $R^4$ is hydrogen or an alkyl radical containing 1 to 4 carbon atoms, $R^5$ is hydrogen or an alkyl radical containing 1 to 4 carbon atoms, and at least one of $R^5$ is hydrogen, (C) about 45 to 94 weight percent of an unsaturated sulfonic acid selected from the group consisting of (a) a 2-acrylamido-2-alkylidene substituted sulfonic acid of the formula

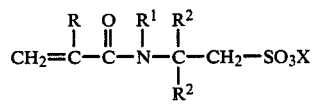

wherein R and R1 are hydrogen or alkyl groups containing 1 to 4 carbon atoms, R2 is hydrogen or alkyl groups containing 1 to 4 carbon atoms, and X is hydrogen or an ammonium or alkali metal cation, (b) styrene sulfonic acid, and (c) vinyl sulfonic acid;

a cross-linking agent for the copolymer comprising a polyfunctional acid compound of zirconium or titanium, the cross-linking agent being present in the range from about 0.25 to 5.0 weight percent based on the weight of copolymer, calculated as $ZrO_2$ or $TiO_2$; and a fluoride anion donating compound present in a gel degrading amount, said compound being selected from the group consisting of cryolite, $Na_3AlF_6$, potassium, hexafluorophosphate, potassium fluorosilicate, sodium tetrafluoroborate, alkyl or aryl sulfryl fluorides and organic halides of the formulae:

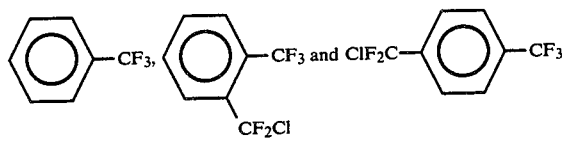
7. The aqueous gel of claim 6, wherein the cross-linking agent is selected from the group consisting of sodium zirconium citrate, zirconium lactate, zirconium lactate citrate, and ammonium titanium lactate.
8. The aqueous gel of claim 7, wherein fluoride anion donating compound is selected from the group consisting of cryolite and potassium hexafluorophosphate.
* * * * *